April 20, 1926.

F. A. WISHART 1,581,412

GREASING DEVICE

Filed Feb. 12, 1923

INVENTOR.
Frank A. Wishart.

BY

ATTORNEY.

April 20, 1926.
F. A. WISHART
GREASING DEVICE
Filed Feb. 12, 1923
1,581,412
2 Sheets-Sheet 2
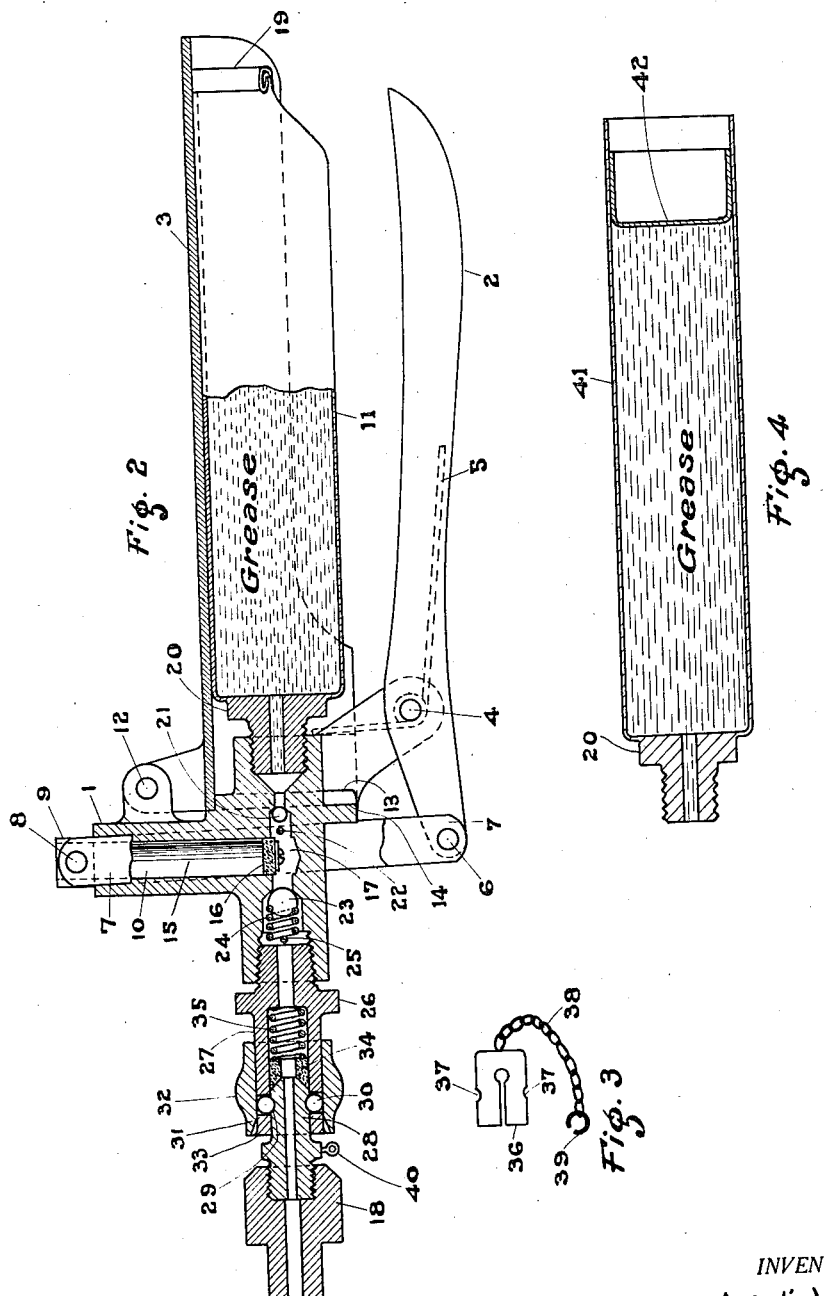
INVENTOR.
Frank A. Wishart.
BY
ATTORNEY.

Patented Apr. 20, 1926.

1,581,412

UNITED STATES PATENT OFFICE.

FRANK A. WISHART, OF OAKLAND, CALIFORNIA, ASSIGNOR OF ONE-HALF TO LEWIS N. DE VINEY, OF OAKLAND, CALIFORNIA.

GREASING DEVICE.

Application filed February 12, 1923. Serial No. 618,566.

*To all whom it may concern:*

Be it known that I, FRANK A. WISHART, a citizen of the United States, residing at Oakland, in the county of Alameda and State of California, have invented new and useful Improvements in a Greasing Device, of which the following is a specification and which is illustrated in the accompanying drawings.

My invention relates to means for the pressure greasing of bearings, especially automobile body and spring bearings, pins, etc.

It has for its objects a lighter, simpler, and much more convenient device than devices heretofore used for the purpose mentioned, and a mechanism which may be operated with but one hand, and which is recharged with grease by the insertion of a commercial grease cartridge or tube, thus avoiding the very disagreeable task of refilling such devices.

The objects of my invention as outlined are secured through my improved construction shown in the drawings forming part of this application and in which, Figure 1 shows in perspective, an approximately full size view of my greasing device complete with a grease cartridge tube in place.

Figure 2 is a longitudinal cross section of the device and shows the arrangement of ports, valves, plunger, etc., within the device, and it is shown connected to an attaching nipple permanently screwed into a bearing or any hollow drilled bearing pin with which the device is to be used.

Figure 3 is a dust cap for the nipple when the device is removed. Figure 4 is a modified form of grease cartridge.

Figure 1:
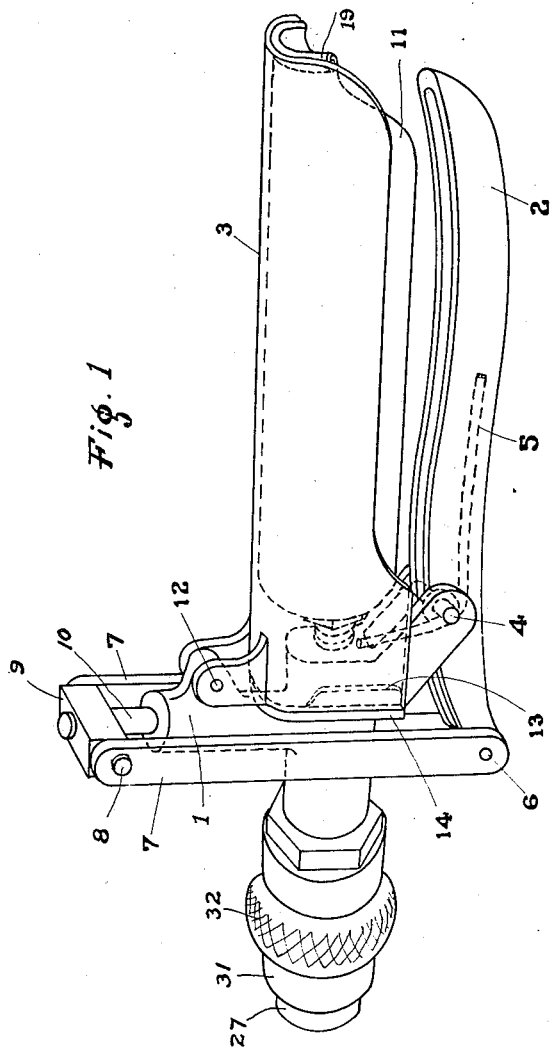

In further detail it will be seen by reference to Figure 1 that my greasing device consists of a body 1 having a pair of plier-like handles 2 and 3, one of which (2) is pivoted to two ribs on the body at 4 and is normally forced outwardly by the spring 5 reacting against the body, and is also pivoted at 6 to a pair of links 7 extending upwardly and pivoted at 8 through a block 9 to the end of a plunger or piston 10. The handle connected to the plunger as described is adapted to work the plunger in and out of a tightly fitting bore in the body upon grasping the device in one hand and working the spring handle like a pair of pliers.

The other handle 3 is of curved shell formation, normally fixed, and partially enclosing and protecting a special grease cartridge or collapsible tube 11. The handle 3 while rigid and fixed during the operation of the device, may be swung back on the pivot 12 securing it to the body, to permit of easy insertion of a grease cartridge when one is used up. The portion of the handle abutting the body of the device is of U form and fits tightly over small flanges 13 extending from the body and also abuts a flange 14 formed on the body.

The end of the device extending opposite the handle 3 has a certain coupling arrangement for attaching it to a bearing to be greased, as shown in the longitudinal cross section in Figure 2, wherein the various parts described have the numbers already given, and wherein the plunger 10 working in the bore 15 has on its lower end a snugly fitting soft leather 16.

A hole 17 leads past the lower end of the bore to convey grease from a cartridge or tube 11 to the bearing 18 to be greased. The grease cartridge 11 is here shown as a collapsible tube, such as used for tooth paste etc., and it is especially formed to better fit the device by having the extreme end 19 curved as shown so that the hinged shell handle 3 can seat tightly against it the entire length, also the tube has a hexagon nut formed on its neck at 20 to permit its being tightly screwed in place without injury to the tube; the handle 3 being swung out of the way while this is being done.

The hole 17 has two ball check valves as clearly shown, the smaller ball 21 being free in the channel but restrained from much displacement by a small transverse pin 22, and the larger ball 23 being spring seated through means of the spring 24 held by the pin 25.

The coupling arrangement consists of a threaded member 26 screwed tightly into the body and having a tubular extension 27 extending away from the device. This extension is adapted to slide over a nipple 28 permanently screwed into the bearing 18 to be greased, and the outer end of the nipple has a groove 29 turned in its outer surface.

The extension piece 27 has a plurality of balls 30 fitted in holes near its end, the holes being upset at their inner edges so that the balls tho free to move in and out cannot fall entirely through the holes.

Outside of the extension piece is an interiorly tapered sliding sleeve 31 knurled outside at 32 so that it may be slid back and forth on the extension piece, but not entirely off by reason of the latter piece being upset at the outer edge 33 as shown.

To couple the device, the sleeve is pulled back to release the balls, the extension piece is slipped over the nipple, the device is pushed toward the nipple until the balls are over the groove 29, the sleeve is then pushed forward to lock the balls in the groove, and the device is ready to use.

To form a tight seat between the nipple and the device, the former has a conical end as shown, and presses against a complementarily seated leather ring 34 snugly fitting within the extension piece and always forced forward by the spring 35. When the device is uncoupled the leather ring is forced forward a trifle until the spring is spent, but does not fall out of place due to its resiliency and the friction of its fitting.

In Figure 3 is shown a small spring fitting dust cap 36 to fit over the nipple 28 when the device is removed. The cap has locking indentations 37 as indicated, which fit into the nipple groove 29, and it also has a small chain 38 terminating in a ring 39 for attaching to a similar ring 40 on the nipple, to prevent its dropping in the dust or dirt when removed.

In Figure 4 is shown an optional form of grease cartridge consisting of a stiff tubular body 41 with a threaded nozzle for attaching it to the device as described for the collapsible tube, and it is open at the extreme end with an easily sliding loose head 42 inserted, after being filled with grease, by the manufacturer.

In operation, due to the check valves and pumping action of the plunger, at the outer end of the stroke the bore is filled with grease sucked from the cartridge or tube by the vacuum tending to be formed, and the inward stroke forces it under great pressure into the bearing, the check valve to the cartridge meanwhile closing. The cartridge, if a tube, yields up is grease to the device by collapsing automatically due to extraneous air pressure, and, if the modified form of cartridge shown in Figure 4 is used, the grease is forced out of the cartridge by the automatic retraction of the loose head through atmospheric pressure.

It is my intention with this device, that the grease cartridges of either form be supplied to the public by the manufacturer as a commercial package like vaseline in tubes, completely filled and ready to simply screw in place on the device, thereby eliminating any contact whatever with grease by the user, and entirely avoiding the erstwhile very disagreeable necessity of filling such "grease guns", and it will be seen by anyone that has ever used a so called "grease gun", that my device is in every way superior, being smaller and lighter, operatable with one hand, connected by pushing straight on the receiving nipple and locked thereon without twisting, (which might be impossible in crowded places), is loaded with grease cartridges automatically collapsing through atmospheric pressure, and protects the cartridge from injury by being contained within the handle.

I therefore claim:—

1. In a grease gun of the character described, a body having a pump cylinder formed therein with an inlet and an outlet passage, a plunger in the cylinder projecting at one end therefrom, a pair of operating handles projecting from the body, one of said handles being pivoted to the body at a point remote from the projecting plunger, a pair of links passing entirely across the body at opposite sides thereof pivoted at one end each to the pivoted handle at a point beyond one side of the body, and at the other ends each to opposite sides respectively of the projecting plunger at a point beyond the other side of the body.

2. In a manually operated grease force pump, a pump body, a pair of handles extending from the body, one of said handles being pivoted to the body to oscillate and connected for operation of the pump, and the other handle being formed to embrace a grease container and pivoted to the body to swing away free from the container, to facilitate manipulation of the container.

3. A grease gun of the character described comprising a body provided with force pump mechanism having an inlet and an outlet passage for grease, a channel-shaped handle extending from the body on the opposite side thereof to the outlet and substantially in axial alignment therewith, said handle being adjacent the grease inlet and adapted to house a grease container connected to the inlet, and a handle connected for operating the pump mechanism pivotally connected to the body and extending in operative relation to the channel-shaped handle.

4. A grease gun comprising a body provided with a cylinder and an operative plunger therein, a grease passage extending straight through the body transversely of the cylinder and communicating therewith, suction and discharge valves in the passage on opposite sides of the cylinder, a pair of co-operating handles extending from the body, one of said handles being of channel-form and extending from the body in substantially axial alignment with said passage, and the other handle being pivoted to the body and linked to the plunger for operation thereby.

FRANK A. WISHART.